US012282570B1

(12) United States Patent
Jones, Jr. et al.

(10) Patent No.: US 12,282,570 B1
(45) Date of Patent: Apr. 22, 2025

(54) SYSTEMS AND METHODS FOR SHARING VENDOR INFORMATION ACROSS ENTITIES IN THE WORKPLACE

(71) Applicant: United Services Automobile Association (USAA), San Antonio, TX (US)

(72) Inventors: David M. Jones, Jr., San Antonio, TX (US); Robert Lee Black, San Antonio, TX (US); Timothy Blair Chalmers, San Antonio, TX (US); Gideon Bowie Luck, Wylie, TX (US); Sumita T. Jonak, San Antonio, TX (US); Ana Rosa Maldonado, San Antonio, TX (US); Oscar Roberto Tijerina, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 299 days.

(21) Appl. No.: 17/685,065

(22) Filed: Mar. 2, 2022

Related U.S. Application Data

(60) Provisional application No. 63/157,191, filed on Mar. 5, 2021.

(51) Int. Cl.
*G06F 21/00* (2013.01)
*G06F 21/62* (2013.01)

(52) U.S. Cl.
CPC .................. *G06F 21/6209* (2013.01)

(58) Field of Classification Search
CPC ..................................... G06F 21/6209
See application file for complete search history.

(56) References Cited

U.S. PATENT DOCUMENTS

| 8,844,059 B1* | 9/2014 | Manmohan | G06F 21/6218 |
| | | | 726/28 |
| 9,721,399 B2* | 8/2017 | Ishikawa | G07C 5/0808 |
| 10,044,501 B1* | 8/2018 | Bradley | H04L 63/0492 |
| 10,834,073 B2* | 11/2020 | Nayak | H04L 63/083 |
| 2014/0375750 A1* | 12/2014 | Yoshida | H04M 3/567 |
| | | | 348/14.07 |
| 2017/0104893 A1* | 4/2017 | Hardy | H04N 5/913 |
| 2020/0342145 A1* | 10/2020 | Pastore | G06F 21/53 |

FOREIGN PATENT DOCUMENTS

JP 2017021477 A * 1/2017

* cited by examiner

*Primary Examiner* — Shin-Hon (Eric) Chen
(74) *Attorney, Agent, or Firm* — Fletcher Yoder, PC (57) ABSTRACT

The current embodiments include systems and techniques for sharing information between vendors where the information is siloed due organizational constraints. Vendors that provide services for one entity of an organization may be unknown to another entity within the same organization. The systems and techniques provided herein facilitate sharing of this information of the vendor across various entities in the organization.

14 Claims, 5 Drawing Sheets

| 302 Organisation: | 302 Template ID: DP-COM-0029 |
| Project: | Template Version: 9 From Version: 6 |
| Team: | Form created |

Scope of Work

Automated Form Number    Template Library-Example Template Project-Example Team-DP-COM-009 -7

Client and Project Information ← 302

Name of Client/Organisation  VIC Government Roadworks and Infrastructure

Client/Organisation Details ← 302

| Address | Telephone Number | Fax |
|---|---|---|
|  |  |  |

Contact Person Details

| Name of Contact Person | Role of Contact Person | Phone Number | Email Address |
|---|---|---|---|
|  |  |  |  |

Project Information

Name of Project          Great Ocean Road Freeway Connect
Project Location
Project Description Sustain jobs and Enable Regional Development:

Architect Selection Process  1. Establish specific selection criteria
2. Determine if you will utilise a one-step or multi-step selection process.
3. Determine a realistic timeframe based on the process that you utilise (2 weeks)
4. Speak with fellow hospital executives who have hired architects and learn from their experience.
5. Work with legal counsel to create an agreement that is sent out with the RFP.
6. Selection committee meet face to face to get a sense of their communication style, group presence, experience, sense of flexibility and chemistry with the hospital team and amongst themselves.
7. Choose architect Pre-Design Work          • Drawings- confirmed draft v1
Completed to Date
or Required

Timeline of Project

| Start Design Work | Start construction | Planned Completion Date |
|---|---|---|
| 01/02/2019 | 02/02/2020 | 01/06/2024 |

SYSTEMS AND METHODS FOR SHARING VENDOR INFORMATION ACROSS ENTITIES IN THE WORKPLACE

CROSS-REFERENCE TO RELATED APPLICATION

The present application claims the benefit of and priority to U.S. Provisional Patent Application No. 63/157,191, titled "Systems and Methods for Sharing Vendor Information Across Entities in the Workplace" and filed on Mar. 5, 2021, and which is herein incorporated by reference in its entirety for all purposes.

BACKGROUND

The present disclosure relates generally to sharing information for vendors where the information is siloed due organizational constraints. Vendors that provide services for one entity of an organization may be unknown to another entity within the same organization. At times, it may be beneficial to share information about the vendor across various entities in the organization.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Large organizations often use a particular vendor across different entities within their organization. Due to certain organizational constraints, information about the particular vendor may not be shared across the different entities. Accordingly, it may follow that the particular vendor may be able to set out different price structures, and types of services for the different entities without these differences being known. Additionally, duplicate projects within the organization may occur, when the different entities are not aware of the particular vendor providing a particular service to a sister entity within the organization. As can be appreciated, sharing information pertaining to the price structure and the quality and type of services provided by a vendor with the entities could assist the organization with overall cost savings, quality control, and a reduction in an occurrence of duplicate projects. However, regulations or company policies may restrict aspects of sharing certain information across entities and/or a format in which the information can be shared.

With the foregoing in mind, in some embodiments, the methods described herein may include receiving an indication that a user associated with a first entity is accessing a document from a vendor, where the vendor provides a service for the first entity. The methods include storing the document from the vendor on a server associated with the first entity. The methods may include analyzing content of the document from the vendor and receiving information associated with the vendor from a cache and receiving rules for sharing the content. The saved cache may be accessed to access any document-specific dependencies, while the rules may be any specific regulations, company policies, laws, and so forth that require certain information to be removed or scrubbed from the document before sharing. The methods described herein may also include blocking access to a portion of the analyzed content from the document based in part on the cache and the rules. Blocking or removing the information may include deleting or redacting the information from the document so that it is no longer accessible when shared. The methods may include sharing a remaining portion of the document with a second entity, where the remaining portion of the document does not include the blocked portion of the document.

In addition, the methods described herein may include receiving an indication of a new bid for a particular work-related task for a first entity of an organization or enterprise. The methods may include monitoring a plurality of bids from one or more vendors. It may be appreciated that some of the one or more vendors may have previously provided services for other entities (e.g., a second entity) within the organization. Accordingly, the methods described herein may include requesting information from the other entity (i.e., the second entity) that can be used to assess the quote for the bid received by the first entity. The information may include a project specification, a quote, a review of the vendor, and so forth.

The methods described herein may also include receiving a user request to access an electronic document. The methods described herein include determining that the electronic document includes confidential information that should not be displayed to the user, saved by the user, or both, and providing a graphical user interface (GUI) that includes a rendering of the electronic document. The GUI includes mitigation features that cause the confidential information not to be displayed to the user, causes saving of the electronic document by the user to be disabled, or both. It may be appreciated that disabling the view of the document may include blurring, concealing, or otherwise obstructing a view of the electronic document. In the event that the electronic document has been saved to a user's mobile device or tablet, the methods described herein may retrieve the saved copies of the document and delete them. It may be appreciated that saving the document could include taking a picture of the restricted document, printing the restricted document, or taking a screen shot of the restricted document. Upon detecting that the user has taken a picture of the restricted document, the methods disclosed herein may include accessing the picture(s) of the restricted document and deleting the picture(s) from the user's mobile device or tablet.

Figure 1:
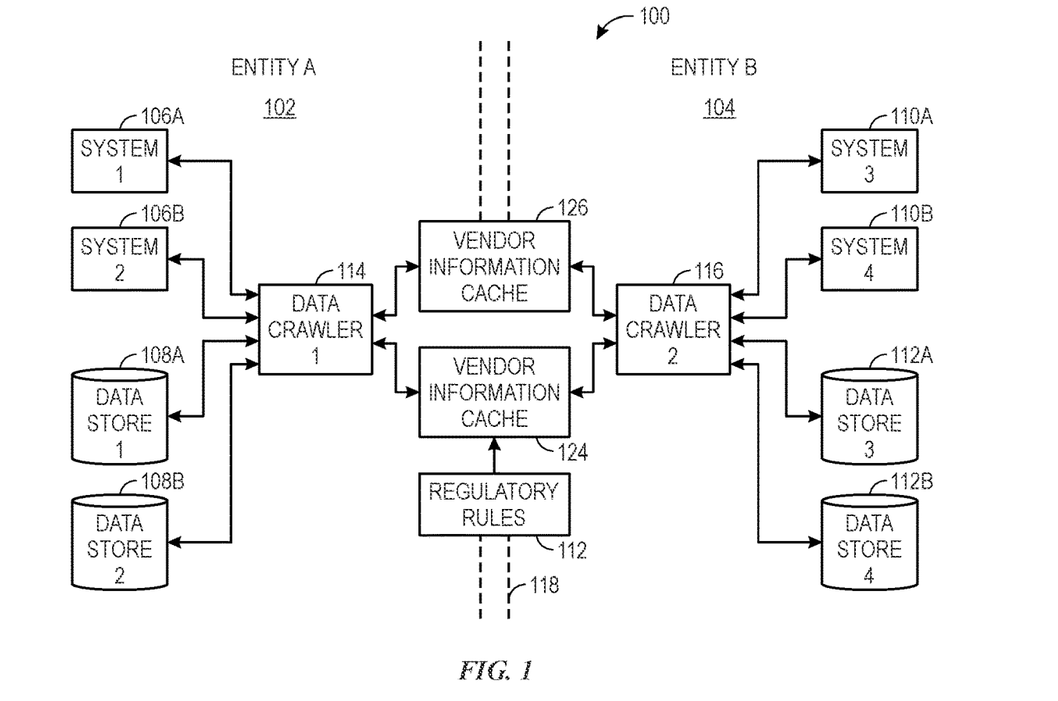
FIG. 1 illustrates a block diagram of an example network communication system, in accordance with embodiments described herein.

By way of introduction, FIG. 1 illustrates a block diagram of an example network communication system 100, in accordance with embodiments described herein. The network communication system 100 includes at least a first entity 102 (e.g., a first silo) and a second entity 104 (e.g., a second silo). The first entity 102 may be associated with a particular business unit of an enterprise, while the second entity 104 may be associated with a different, unrelated business unit of the enterprise. Both the first entity 102 and the second entity 104 may have various computer equipment for conducting various business functions, including but not limited to accessing business related documents to conduct business operations. For example, the first entity 102 may include one or more computer systems 106 (e.g., 106A, 106B) and one or more data stores 108 (e.g., 108A, 108B). Similarly, the second entity 104 may include one or more computer systems 110 (e.g., 110A, 110B) and one or more data stores 112 (e.g., 112A, 112B). Each of the computer systems 106, 110 and the data stores 108, 112 may be in communication with a respective data crawler 114, 116. The data crawlers 114, 116 may be separated by a firewall 118 to decide whether to allow or block certain content based on defined security measures 120. The defined security measures 120 may include regulatory rules 122, a data filter 124, and/or a vendor information cache 126. The data filter 124 may receive regulatory information via the regulatory rules 122. The regulatory rules 122 provide certain information that the data filter 124 may scrub from records received from the data crawlers 114, 116. The records may also be compared against the vendor information cache 126 in order to confirm that the records belong to the particular vendor. After the records are adequately filtered or scrubbed by the data filter 124 based upon the regulatory rules 122, and validated via the vendor information cache 126, the scrubbed records may then be shared from the first entity 102 to the second entity 104 (or vice versa), as described in detail below.

Figure 2:
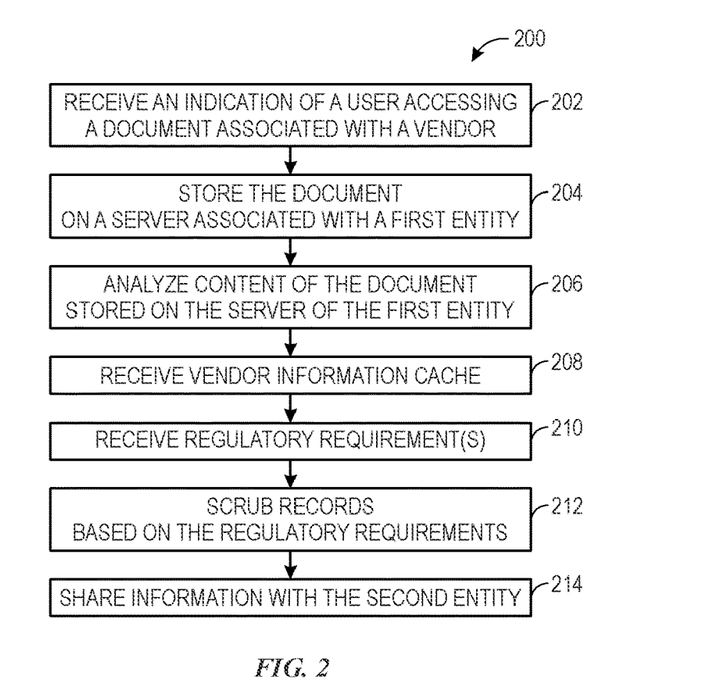
FIG. 2 illustrates a flow chart for sharing selected content among entities of an enterprise that may be utilized by the network communication system of FIG. 1, in accordance with embodiments described herein.

FIG. 2 illustrates a method 200 for sharing selected content among entities 104, 106 of an enterprise that may be utilized by the network communication system 100 of FIG. 1. The method 200 includes receiving (block 202) an indication of a user accessing a document associated with a vendor. The indication may be received when the user accesses a document type or document location. The method 200 may include storing (block 204) the document on a server associated with a first entity. The document may include a project proposal, bid, contract, purchase order, invoice, email, and the like. The first entity may include an entity such as a retail banking entity. The retail banking entity may have certain rules or regulations that pertain to the business operations that are specific to the particular entity.

The method 200 includes analyzing (block 206) content of the document stored on the server of the first entity. The document may be analyzed for content such as a requisition number, a scope of work, a heading, a particular finding, phrase, or description, a picture or image, a value or cost of a service, and so forth. Certain content may be identified as content that should not be shared with another entity due to regulatory requirements or due to a company policy or should be analyzed further before sharing with another entity.

The method 200 includes receiving (block 208) a vendor cache with information pertaining to the particular vendor. For example, the vendor cache can be compared with a data lake or a web cache system in order to validate that the records have been properly identified. Comparing the vendor cache with the data lake or the web cache system also provides an opportunity to identify any information that is potentially inconsistent or inaccurate due to vendor changes (e.g., a new address, a new invoice procedure, and so forth).

The method 200 includes receiving (block 210) regulatory requirements for the particular entity. For example, the entity may be a banking or financial business that is subject to laws and regulations associated with the finance industry (e.g., Federal Reserve Board (FRB) regulations, Federal Deposit Insurance Corporation (FDIC), Securities and Exchange Commission (SEC) regulations, Financial Industry Regulatory Authority (FINRA) regulations, and so forth. These laws and regulations may require that certain information not be shared with other employees. For example, the laws and/or regulations may require that the information not be shared across business entities (e.g., from financial or banking industry to insurance industry) or with employees that do not have certain licenses (e.g., Series 7, Series 63, CPA).

The method 200 includes scrubbing (block 212) records based on the regulatory requirements. Indeed, the pertinent laws and regulations may require that certain information (e.g., secure information, financial information, etc.) not be shared. Accordingly, certain information may be filtered out of the document, redacted, or otherwise removed from the document before it is shared (block 214) with a second entity. As discussed above, the first entity 102 and the second entity 104 may be sister organizations within a parent enterprise.

Figure 3:
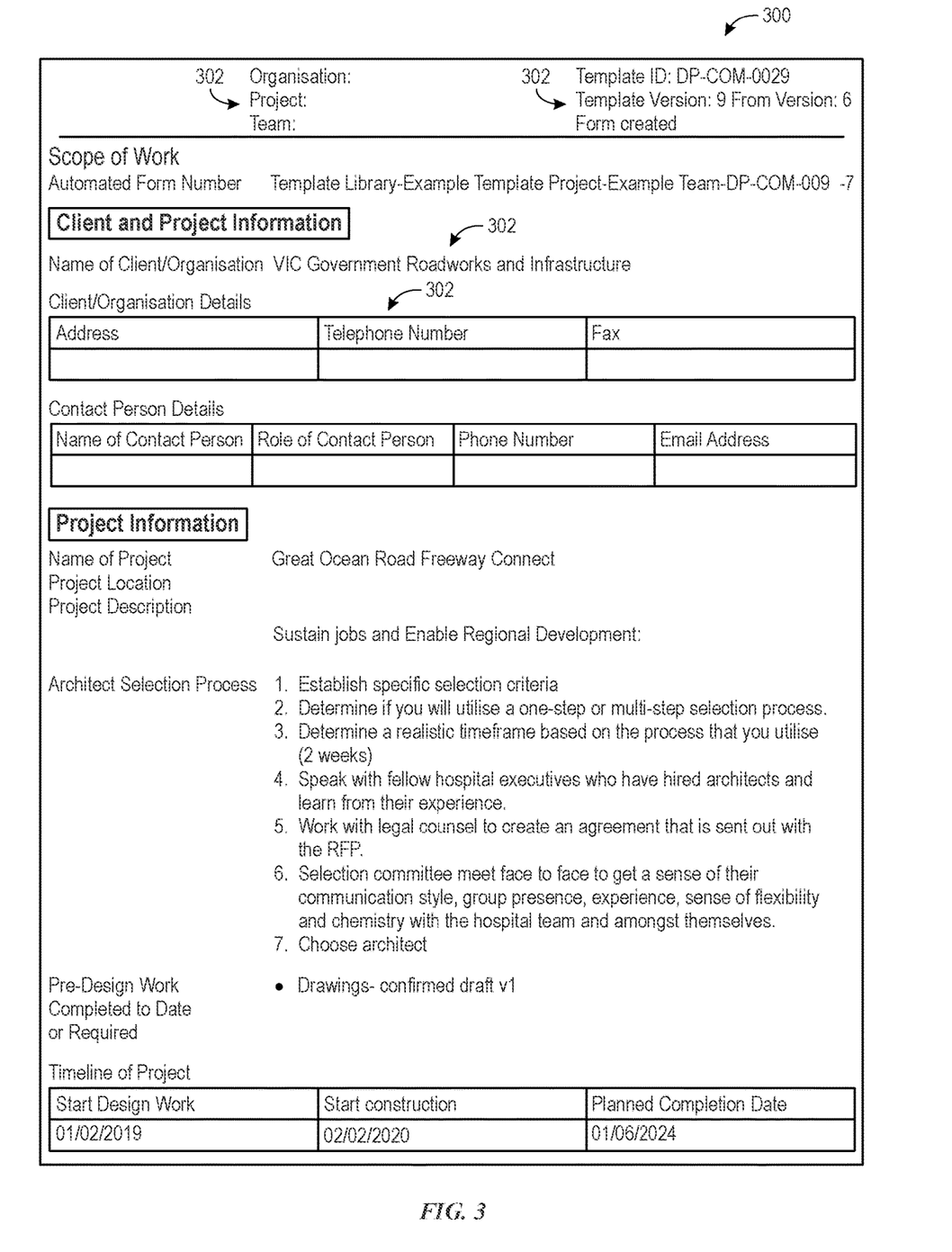
FIG. 3 illustrates a screen shot of a document that may be utilized by the network communication system of FIG. 1, in accordance with embodiments described herein.

FIG. 3 illustrates a screen shot of a document 300 that may be utilized by the network communication system 100 of FIG. 1, in accordance with embodiments described herein. The illustrated document 300 is a scope of work document, though it should be understood that the document 300 can be any suitable document including, but not limited to, an email, an invoice, a work order, a project proposal, a bid, a contract, a purchase order, and the like. The document 300 includes content 302 that is analyzed as described above. For example, the content 302 may include information that is shareable with another entity or unshareable due to privacy concerns and regulations. Such information that may be shareable across entities may include client and project information, a name of a client and/or an organization, a form or project number, a document number (e.g., form number, template version or number, ID number), a project name, a project location, a project description, a project timeline, and so forth.

A review or internal ranking of the vendor can be shared across entities as well, though the review or the internal ranking may not be included in the content 302 of the document. Information that may be restricted for sharing across entities may include cash values and other monetary assets, loans receivable and loan guarantee liabilities, federal debt securities federal employee and veteran benefits payable, property, plant, and equipment information, insurance and guarantee program liabilities, fiduciary activities, debt and equity securities, environmental and disposal liabilities, stewardship investments, financial commitments, private and public partnerships, and the like. When particular laws, regulations, and/or company policies may require that certain information (e.g., unshareable information) is not shared across entities, this information may be filtered out of the document, redacted, or otherwise removed from the document before it is shared with a sister entity (e.g., the first entity 102 or the second entity 104).

Figure 4:
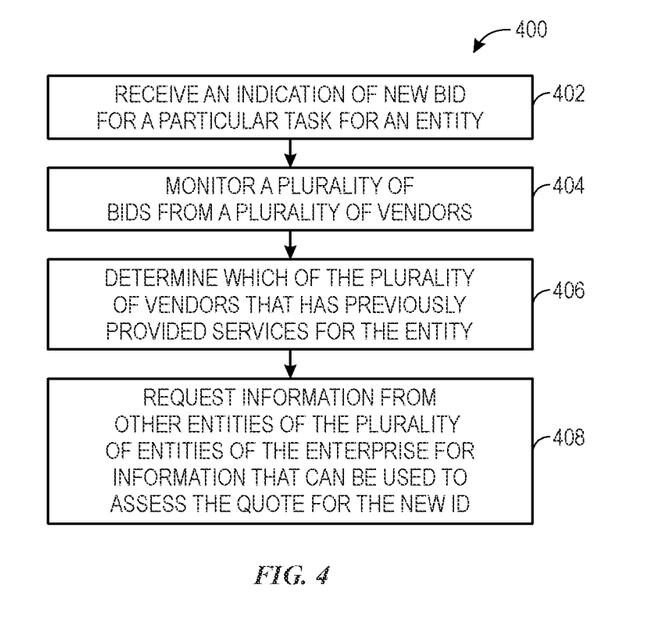
FIG. 4 illustrates a flow chart for determining whether a particular vendor has provided services to an entity of the enterprise that may be utilized by the network communication system of FIG. 1, in accordance with embodiments described herein.

FIG. 4 illustrates a method 400 for determining whether a particular vendor 402 has engaged with and/or provided services to a first entity 102, 104 of the enterprise that may be utilized by the network communication system 100 of FIG. 1, in accordance with embodiments described herein. The method 400 include receiving (block 402) an indication of a new bid for a particular task of the first entity. The indication may be an alert of a new bid or proposal, an email with a new bid or project proposal, a bid or proposal submitted via an online-portal, or the like.

The method 400 may include monitoring (block 404) a plurality of bids received from a plurality of vendors. It may be appreciated that particular vendors may submit a new bid for each new proposal, while other vendors may utilize standard proposals with set fees and a set scope of work. The vendors may submit their bids in any suitable manner, including via an online-portal, email, facsimile, and so forth.

The method 400 may include determining (block 406) which of the plurality of vendors has previously provided services for the first entity. It may be appreciated that the vendors may have provided similar services or services for an entirely different scope of work. For example, a particular vendor may have provided a procurement service for a facility associated with the first entity regularly over time. In another example, a general service law firm may have provided legal services associated with a financial transaction, but never for a different scope of work (e.g., real estate transaction).

The method 400 may include requesting (block 408) information from other entities within the parent enterprise to adequately assess the new bid received by the first entity. The information from the other entities within the parent enterprise may include quotes for similar services, terms and conditions that the vendor agreed to that are associated with a contract or scope of work, a rating of the vendor by the other entity, and the like.

Figure 5:
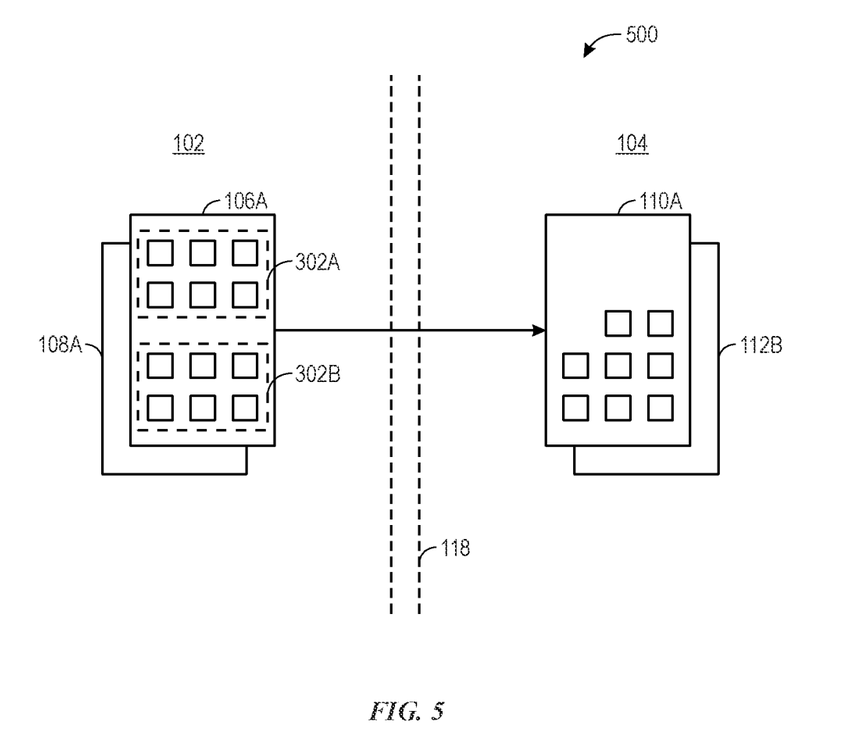
FIG. 5 illustrates block diagram illustrating sharing the selected content that may be utilized by the network communication system of FIG. 1, in accordance with embodiments described herein.

FIG. 5 illustrates block diagram 500 illustrating sharing selected content 302 that may be utilized by the network communication system of FIG. 1, in accordance with embodiments described herein. As shown, the content 302 that is not subject to any sharing restrictions due to company policies or any particular legal regulations and so forth may be shared across the firewall 118 in order to share information from the first entity 102 with the second entity 104 that may be useful in evaluating a particular vendor. In the illustrated embodiment, the content 302A that may be shared across the firewall 118 in order to assess the particular vendor for suitability within the second entity 104 may include client and project information, a name of a client and/or an organization, a form or project number, a document number (e.g., form number, template version or number, ID number), a project name, a project location, a project description, and a project timeline. As discussed above, a review or internal ranking of the vendor can be shared across entities as well, though the review or the internal ranking may not be included in the content 302 of the document. The shared content 302A may be shared and stored on the computer systems 110A, 110B and/or the data stores 112A, 112B of the network communication system 100.

The content 302 that is not suitable for sharing is redacted or removed from the document 300 as discussed above. Such information remains with the first entity 102 so that any restrictions on sharing the content 302B are not violated. Such information that may be restricted for sharing across entities 102, 104 may include cash values and other monetary assets, loans receivable and loan guarantee liabilities, federal debt securities federal employee and veteran benefits payable, property, plant, and equipment information, insurance and guarantee program liabilities, fiduciary activities, debt and equity securities, environmental and disposal liabilities, stewardship investments, financial commitments, private and public partnerships, and the like. The restricted content 302B may remain on its respective computer system 106 A, B and/or the respective data store 108 A, B of the network communication system 100 and is not shared across the firewall 118. In some embodiments, the document is not shared across entities the 102, 104, and a point-of-contact associated with the document may be shared across the entities 102, 104 instead. For example, contact information of an employee associated with the document may be provided instead. The employee may have a position have a position in engineering, procurement, contract management, legal, risk management, and so forth. In this manner, the employee can be contacted to discuss the vendor, gauge interest in engaging the vendor again, discuss project specific details, and so forth.

Figure 6:
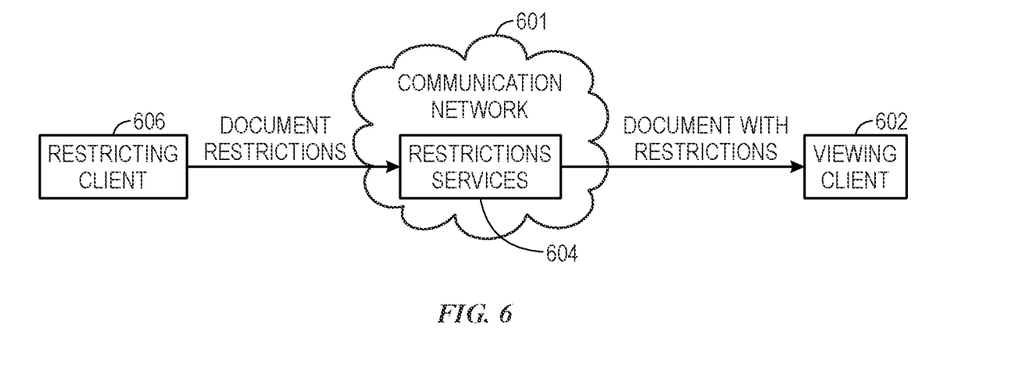
FIG. 6 illustrates a block diagram of an example network communication system for restricting viewing access of a particular document, in accordance with embodiments described herein.

As mentioned above, in some instances, it may be desirable to place certain restrictions on document viewing. FIG. 6 illustrates a block diagram of an example network communication system 600 for restricting viewing access of a particular document, in accordance with embodiments described herein. As illustrated, a network 601, such as a wireless network, may provide connectivity to a viewing client 602, such as a computer or a smart phone and a restricting client. The viewing client 602 may be an employee that is at work at the employee's office building. The viewing client 602 may be a personal smart phone or personal computer of the employee. As may be appreciated, the employee may have previously agreed to allow monitoring of the employee's computer and/or smart phone while at work, particularly on the employer's communications network(s), as the employer may be concerned about an employee's use of time, confidential material being accessed outside of the scope of an employee's role, and/or disclosure of such confidential information.

Accordingly, the employer may utilize one or more restriction services 604 (e.g., restriction policies) in order to protect such information. In one embodiment, the restriction services 604 may be provided by an operator of a wireless network. For example, when the employee is within a particular vicinity of the office building, the employee's online activities (e.g., internet searches, access of files or documents, etc.) may be monitored. The restriction services 604 may receive policies or rules from a restricting client 606 in order to determine which information should or should not be restricted from access by the viewing client 602 and/or in which capacity limited access to the information may be granted, as explained in further detail below. In some embodiments, the restricting client 606 may restrict access to a document or file when the document includes a certain type of information (e.g., documents that are restricted to a clean room environment), confidential information, and the like.

Figure 7:
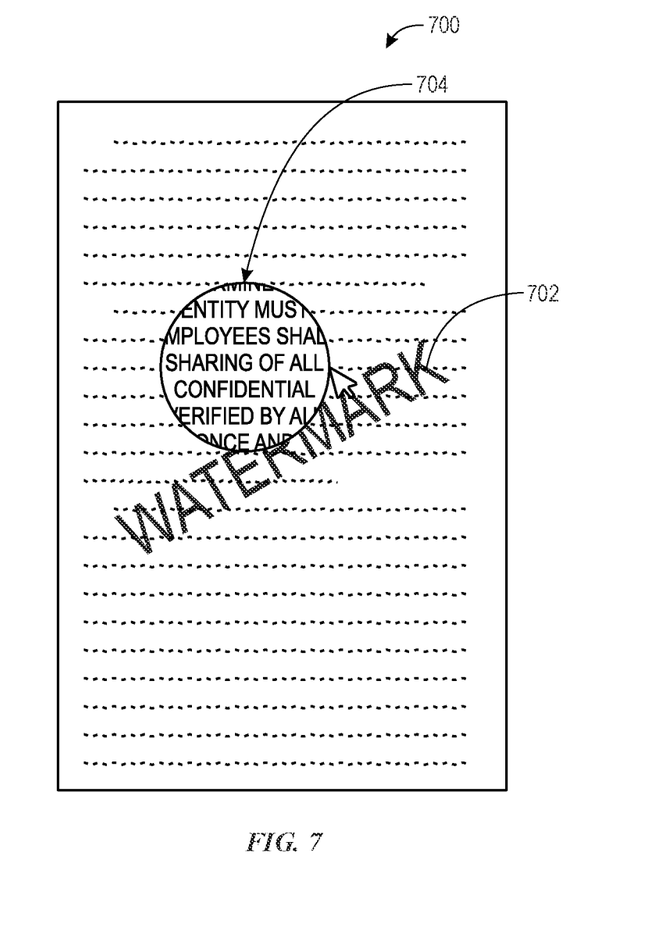
FIG. 7 illustrates a screen shot of a document that may be utilized by the network communication system of FIG. 6, in accordance with embodiments described herein.

FIG. 7 illustrates a screen shot of a document 700 that may be utilized by the network communication system 600 of FIG. 6, in accordance with embodiments described herein. In the illustrated example, the document 700 may be a contract or other document with confidential information as discussed above. The document 700 may include a watermark 702 or other marking to that appears when the document is opened on the communications network 601. In one embodiment, the document 700 may be viewable after the restriction services 604 are rendered. As may be appreciated, the restriction services 604 may include various viewing restrictions that may be implemented in whole or in part. The restriction services 604 may include but are not limited to: disabling a view of the restricted document, determining that a user or employee has saved a document with restricted access and deleting the saved document, obstructing a view of the restricted document, disabling a portion of the restricted document, and/or limiting a viewing area of the restricted document so that only a portion of the restricted document can be viewed at once.

In one embodiment, it may be determined that a user or an employee has attempted to save a copy of the restricted document. Saving the restricted document may include saving a local copy of the document to the employee's computer, taking a screen shot of the restricted document, printing the document, taking a picture of the document, or otherwise preserving the restricted document for future access. It may be appreciated that certain hardware (e.g., a keyboard) may be monitored to determine if the restricted document is being saved. For example, a keyboard shortcut for taking a screen shot (e.g., CTRL+PrtScn, Alt+PrtScn, etc.), saving the document, selecting the document, copying the document, or printing the document may be detected. Additionally, or alternatively, when the user queues certain applications, such as a screen capturing application, may indicate that the user is attempting to save a screen shot of the restricted document. In response to determining that the restricted document has been saved, the view of the document may be disabled or otherwise restricted. It may be appreciated that disabling the document or restricting the access may include deleting a stored picture of the document. For example, if a user takes a picture of the restricted document, the picture of the restricted document may be deleted from the user's device in order to restrict sharing of the restricted document. In another embodiment, disabling the document may include obstructing the view of the document, blurring the text of the document, concealing the text of the document through a redaction or editing tool, and so forth.

In certain embodiments, the restriction services 604 may implemented to disable a portion of the restricted document that is not selected by the employee. In other words, viewing the entire restricted document at once is not feasible, as the restriction services may require the user or employee to hover over or select a portion 704 of the document for viewing. In one embodiment, the restriction services 604 may limit the selectable portion of the restricted document to a certain percentage (e.g., 5%, 10%) of the document or to a certain number of characters relative to the total number of characters in the document. In addition or alternatively, the restriction services may be used to limit a time period for which the selectable portion of the restricted document is accessible.

Figure 8:
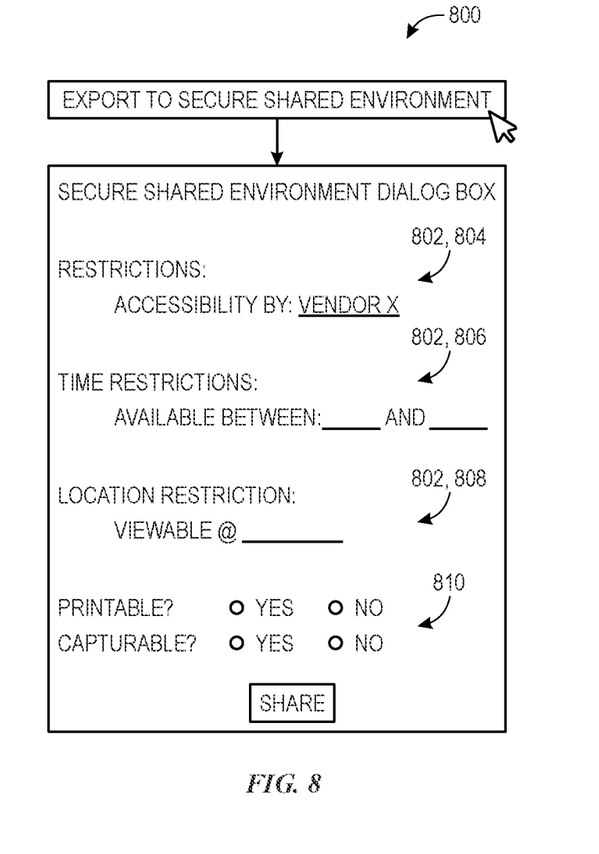
FIG. 8 illustrates a graphical user interface (GUI) for determining how a particular document should be shared across entities of the enterprise, in accordance with embodiments described herein.

FIG. 8 illustrates a graphical user interface (GUI) 800 for determining how a particular document should be shared across entities 102, 104 of the enterprise, in accordance with embodiments described herein. The GUI 800 may be associated with a particular file sharing program. The GUI may be used to create a temporal link that provides temporary access for a user, such as through a temporary password. The GUI 800 may include various selectable icons 802, drop down menus, and the like to implement preferred selections (e.g., to select the desired restriction services to be implemented for a particular document). In the illustrated embodiment, the GUI 800 includes vendor accessibility options 804. The GUI 800 may be used to select a particular vendor that can access a document, a team of vendors that can access the document, conditions under which a vendor can access the document (e.g., during a particular phase of a project), and so forth. In some embodiments, more than one vendor can access the document during a particular phase of the project.

The GUI 800 may also be used to select a time restriction 806 associated with viewing the document. For example, the time restriction 806 may be a particular time of day, a date range when the document is viewable, or a condition associated with the viewing the document (e.g., a first vendor may view the document during a particular project phase or when a second vendor does not have access to view the document). Location restrictions 808 may also be set. For example, the document may be viewable from home, on a secured network, from the office only, and the like. In some embodiments, the document may only be viewable at a location outside of the office when an authentication code or factor is used in conjunction with a login process to verify the user. Other restriction services may be set by selecting one or more selectable buttons or icons 810, such as a button to specify whether the document should be printable or capturable (e.g., whether a screen shot of the document can be taken).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:
1. A processor-implemented method, comprising:
receiving a user request to access an electronic document;

determining that the electronic document includes confidential information displayable to a user but that should not be copied by the user, saved by the user, or both; and providing and displaying, via a computer, a graphical user interface (GUI) comprising a rendering of the electronic document, the GUI comprising mitigation features that cause a display of the confidential information while reducing an ability to copy the electronic document, save the electronic document, or both, by:
  monitoring, via a communication network, usage of a mobile device of the user to detect whether the user has used the mobile device to take a picture of the electronic document displayed via the computer, wherein the mobile device is restricted from accessing to the electronic document;
  upon detection that the user has used the mobile device to take a picture of the electronic document displayed via the computer:
    accessing pictures stored on the mobile device;
    determining which of the pictures include an image of the electronic document;
    deleting the pictures that include the image of the electronic document;
  monitoring usage of a keyboard to detect whether the user has saved a screen shot of the electronic document on the computer via the keyboard, wherein the keyboard is configured to enable screen capturing;
  upon detection that the user has saved the screen shot of the electronic document on the computer via the keyboard, accessing and deleting the screen shot of the electronic document; and
  upon detection that the user has used the mobile device to take the picture of the electronic document displayed via the computer or upon detection that the user has saved the screen shot of the electronic document on the computer via the keyboard:
    disabling view of a portion of the electronic document that is not selected by the user; and
    enabling view of a selected subset of the electronic document that is selected by the user.

2. The processor-implemented method of claim 1, comprising:
  detecting that the user is attempting to capture the screen shot of the electronic document; and
  disabling the user's attempt to capture the screen shot.

3. The processor-implemented method of claim 2, wherein the detecting that the user is attempting to capture the screen shot comprises:
  monitoring the keyboard for a keyboard shortcut, wherein the keyboard shortcut enables the screen shot to be captured or initiating or executing a screen capture application.

4. The processor-implemented method of claim 1, wherein the mitigation features comprise:
  blurring, concealing, or otherwise obstructing a view of the electronic document.

5. The processor-implemented method of claim 1, wherein the selected subset of the electronic document is selected by dynamically hovering over the selected subset of the electronic document.

6. The processor-implemented method of claim 1, wherein the selected subset comprises a limited number of characters that can be displayed relative to a total number of characters in the electronic document.

7. The processor-implemented method of claim 6, wherein the limited number of characters is less than 5% of the total number of characters in the electronic document, and wherein the limited number of characters can be accessed for a limited time period.

8. A tangible, non-transitory, computer-readable medium, comprising computer-readable instructions that, when executed by one or more processors of one or more computers, cause the one or more computers to:
  receive a user request to access an electronic document;
  determine that the electronic document includes confidential information displayable to a user but that should not be copied by the user, saved by the user, or both; and
  provide and display a graphical user interface (GUI) comprising a rendering of the electronic document, the GUI comprising mitigation features that cause a display of the confidential information while reducing an ability to copy the electronic document, the electronic document, or both, by:
    monitoring, via a communication network, usage of a mobile device of the user to detect whether the user has used the mobile device to take a picture of the electronic document displayed via the computer, wherein the mobile device is restricted from accessing to the electronic document;
    upon detection that the user has used the mobile device to take a picture of the electronic document displayed via the computer:
      accessing pictures stored on the mobile device;
      determining which of the pictures include an image of the electronic document;
      deleting the pictures that include the image of the electronic document;
    monitoring usage of a keyboard to detect whether the user has saved a screen shot of the electronic document on the computer via the keyboard, wherein the keyboard is configured to enable screen capturing;
    upon detection that the user has saved the screen shot of the electronic document on the computer via the keyboard, accessing and deleting the screen shot of the electronic document; and
    upon detection that the user has used the mobile device to take the picture of the electronic document displayed via the computer or upon detection that the user has saved the screenshot of the electronic document on the computer via the keyboard:
      disabling view of a portion of the electronic document that is not selected by the user; and
      enabling view of a selected subset of the electronic document that is selected by the user.

9. The tangible, non-transitory, computer-readable medium of claim 8, comprising computer-readable instructions, that, when executed by one or more processors of one or more computers, cause the one or more computers to:
  detect that the user is attempting to capture the screen shot of the electronic document; and
  disable the user's attempt to capture the screen shot.

10. The tangible, non-transitory, computer-readable medium of claim 9, wherein the detecting that the user is attempting to capture the screen shot comprises:
  monitoring the keyboard for a keyboard shortcut, wherein the keyboard shortcut enables the screen shot to be captured or initiating or executing a screen capture application.

11. The tangible, non-transitory, computer-readable medium of claim 8, wherein the mitigation features comprise:

blurring, concealing, or otherwise obstructing a view of the electronic document.

12. The tangible, non-transitory, computer-readable medium of claim 8, wherein the selected subset of the electronic document is selected by dynamically hovering over the selected subset of the electronic document.

13. The tangible, non-transitory, computer-readable medium of claim 8, wherein the selected subset comprises a limited number of characters that can be displayed relative to a total number of characters in the electronic document.

14. The tangible, non-transitory, computer-readable medium of claim 13, wherein the limited number of characters is less than 5% of the total number of characters in the electronic document, and wherein the limited number of characters can be accessed for a limited time period.

\* \* \* \* \*